United States Patent

Tomatsu et al.

Patent Number: 5,551,480
Date of Patent: Sep. 3, 1996

[54] VALVE DRIVING SYSTEM

[75] Inventors: Yoshitaka Tomatsu, Chiryu; Takehito Mizutani, Obu, both of Japan

[73] Assignee: Nippondenso Co., Ltd., Kariya, Japan

[21] Appl. No.: 339,209

[22] Filed: Nov. 10, 1994

[30] Foreign Application Priority Data

Nov. 11, 1993 [JP] Japan .................. 5-282265

[51] Int. Cl.⁶ ............................ F16K 31/06
[52] U.S. Cl. .................. 137/625.29; 251/129.05; 251/129.15; 335/224
[58] Field of Search .............. 251/129.05, 129.15; 335/224; 137/599.2, 625.29

[56] References Cited

U.S. PATENT DOCUMENTS 4,726,389  2/1988  Minoura et al. ............ 251/129.05

FOREIGN PATENT DOCUMENTS

| | | |
|---|---|---|
| 62-122975 | 8/1987 | Japan . |
| 245409 | 10/1987 | Japan .................. 251/129.15 |
| 58890 | 3/1989 | Japan .................. 251/129.15 |
| 231086 | 2/1990 | Japan . |
| 47412 | 2/1991 | Japan .................. 251/129.15 |
| 3172693 | 7/1991 | Japan . |

*Primary Examiner*—Stephen M. Hepperle
*Attorney, Agent, or Firm*—Cushman, Darby & Cushman

[57] ABSTRACT

When the valve is closed, for example at normally-open type valve, the operating voltage applied to the electromagnet is initially set to the minimum operating voltage (6 V, for example), then raised to a voltage (12 V, for example) where sealing caused by contacting force between the valve body and the valve seat is ensured. The voltage is raised almost simultaneously with the contact of the valve body with the valve seat, or slightly earlier or later. Thus, when the valve is closed, the valve body speed when it reaches the valve seat is low, making the operational noise at valve closing smaller. Also, since the operating voltage of the electromagnet is raised later, sealing of the closed valve is ensured.

8 Claims, 5 Drawing Sheets

VALVE DRIVING SYSTEM

BACKGROUND OF THE INVENTION

1. Field of the Invention

The present invention relates to a valve driving system, and, more particularly to a valve driving system having an improved valve with stepwise driving force.

2. Related Art

It has been common to use a solenoid valve for opening and closing a passage. The solenoid valve, using an electromagnet for driving a valve body contained in a valve case, energizes and de-energizes current to the electromagnet, thereby moving the valve body between the valve-close and valve-open positions to open and close the passage. Solenoid valves are divided into two types: normally-open and normally-closed types. In the normally-open type, a return spring in the valve case maintains the valve body in the valve-open position when the valve is de-energized, whereas in the normally-closed type, the return spring maintains the valve body in the valve-close position when it is de-energized.

In the prior configuration explained above, when the valve body is driven from the valve-open position to the valve-close position to close the valve, the electromagnet is energized in the normally-open type (de-energized in the normally-closed type). A driving force as a resultant force of the electromagnetic force of the electromagnet and a spring force of the return spring (the spring force only in the normally-closed type) drives the valve body to the valve-close position. In this case, since the electromagnetic force of the electromagnet in the normally-open type (spring force of the return spring in the normally-closed type) is relatively large to ensure sealing (in other words, contact force between the valve body and the valve seat) of the closed valve, the driving force applied to the valve body is excessively large. As a result, a collision speed of the valve body to the valve seat becomes excessively high and an operational noise is caused by the collision between the valve body and the valve seat.

SUMMARY OF THE INVENTION

The present invention reduces the operational noise when the valve is operated and provides a low noise valve driving system.

In order to accomplish the above object, the valve driving system in the present invention comprises a valve case disposed in a passage, a valve seat disposed in the valve case, a valve body movably disposed in said valve case, a driving means for driving said valve body between a valve-close position where said valve body is pressed against said valve seat and a valve-open position where said valve body is separated from said valve seat, and a driving force control means for controlling a stepwise movement of said driving means by utilizing a duty ratio control.

When the driving means transfers a "ON" signal and drives the valve body, the driving force control means initially weakens the driving force of the driving means. For example, the driving force is set to a minimum driving force necessary to drive the valve body or slightly above it. The collision speed of the valve body slows down when the valve is driven, thus reducing the valve operational noise. The driving force control means strengthens the driving force of the driving means afterwards, so that valve sealing caused by the contacting force between the valve body and the valve seat is ensured in the normally-open type, and the force maintaining the valve body open is ensured in the normally-closed type.

When the driving means transfers a "OFF" signal and drives the valve body, the driving force control means initially strengthens the driving force of the driving means and weakens afterwards. The collision speed of the valve body slows down when the valve is driven, thus reducing the valve operational noise. The driving force control means strengthens the driving force of the driving means afterwards, so that the force maintaining the valve body open is ensured in the normally-open type, and valve sealing caused by the contacting force between the valve body and the valve seat is ensured in the normally-close type.

BRIEF DESCRIPTION OF THE DRAWINGS

Other features and characteristics of the present invention as well as the function of related elements of the structure will become apparent to one of ordinary skill in the art from a study of the subject application and the appended claims and drawings, all of which form a part of this application. In the drawings, like reference numeral represent like elements and:

DETAILED DESCRIPTION OF THE PREFERRED EMBODIMENT

Figure 1:
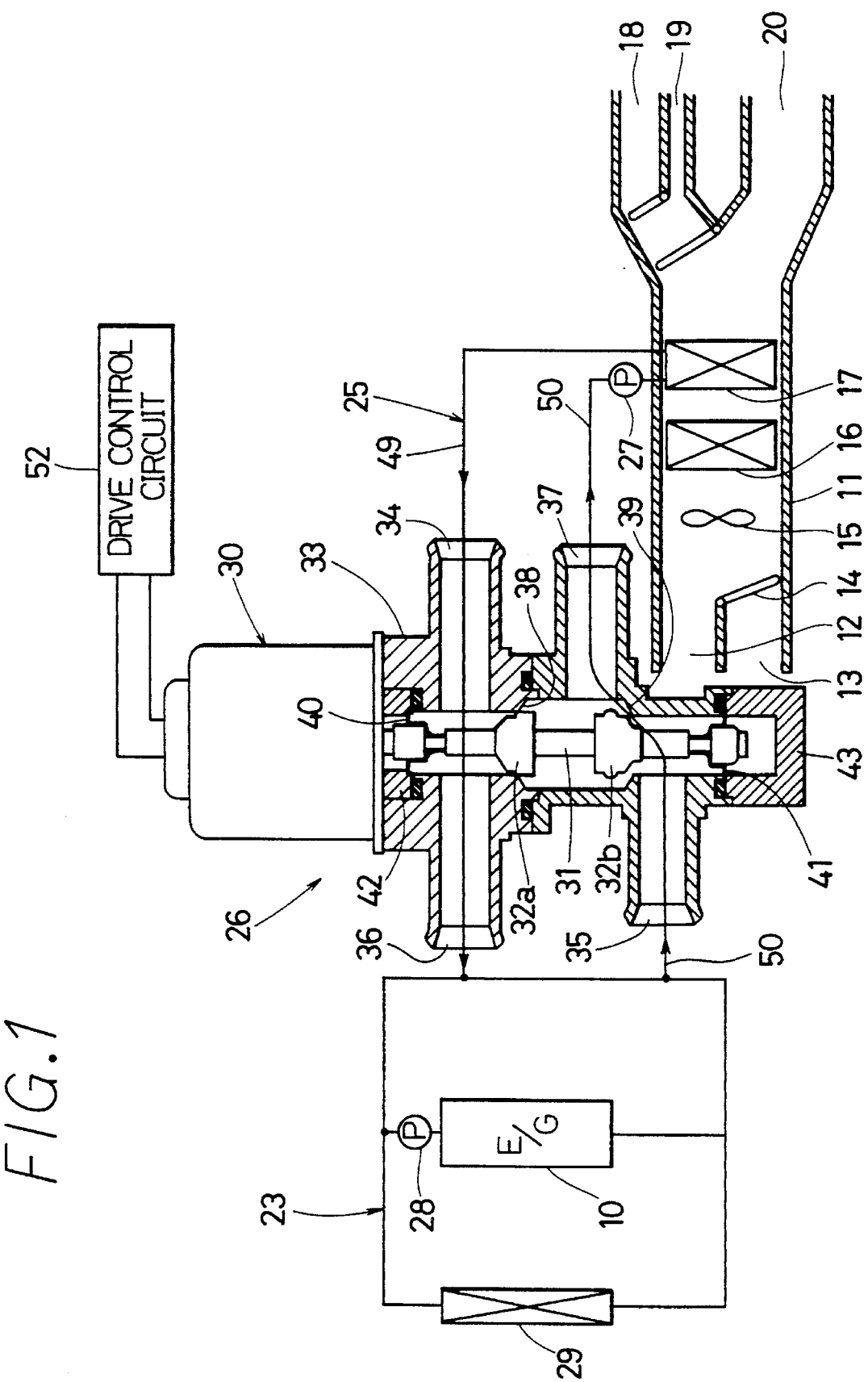
FIG. 1 shows a partial cross-sectional schematic view of automotive air-conditioner utilizing the valve driving system in the first embodiment of the present invention.

The following explains the first embodiment, in which the present invention is applied to an automotive air conditioning equipment, referring to FIG. 1 through FIG. 4 and FIGS. 6 and 7. As shown in FIG. 1, on the upstream end of the air duct 11, there is an exterior air inlet 12 which sucks air from outside the vehicle (exterior air), and an interior air inlet 13 which sucks air from inside the vehicle (interior air). Between the exterior air inlet 12 and the interior air inlet 13, an interior-exterior air damper 14 is provided. The direction of the interior-exterior air damper 14 is changed by a servo motor (not shown) to select between the exterior air inlet 12 and the interior air inlet 13. To the downstream of the interior-exterior air damper 14, a blower 15 is provided, with an evaporator 16 to the downstream of the blower 15. A heater core 17 to the downstream of evaporator 16 takes in the entire air flow that passes through the evaporator 16. To the further downstream of the heater core 17 are three air outlets 18, 19 and 20 for DEF.(Defroster), FACE and FOOT, respectively. The air outlets 18, 19 and 20 are adjusted by dampers 21 and 22.

The evaporator 16 mentioned above forms the refrigerating cycle, together with a compressor driven by the engine 10, a condenser, a receiver, and an expansion valve (all not shown), and cools and dries the air that has passed through the evaporator 16. The heater core 17, on the other hand, is interconnected with the hot water circulation circuit 25 (passage), which receives hot engine coolant that cycles from the engine cooling system 23. In the hot water circulation circuit 25 are a valve system 26 and a pump 27. To the engine cooling system 23, a pump 28 and a radiator 29 are connected.

Figure 2:
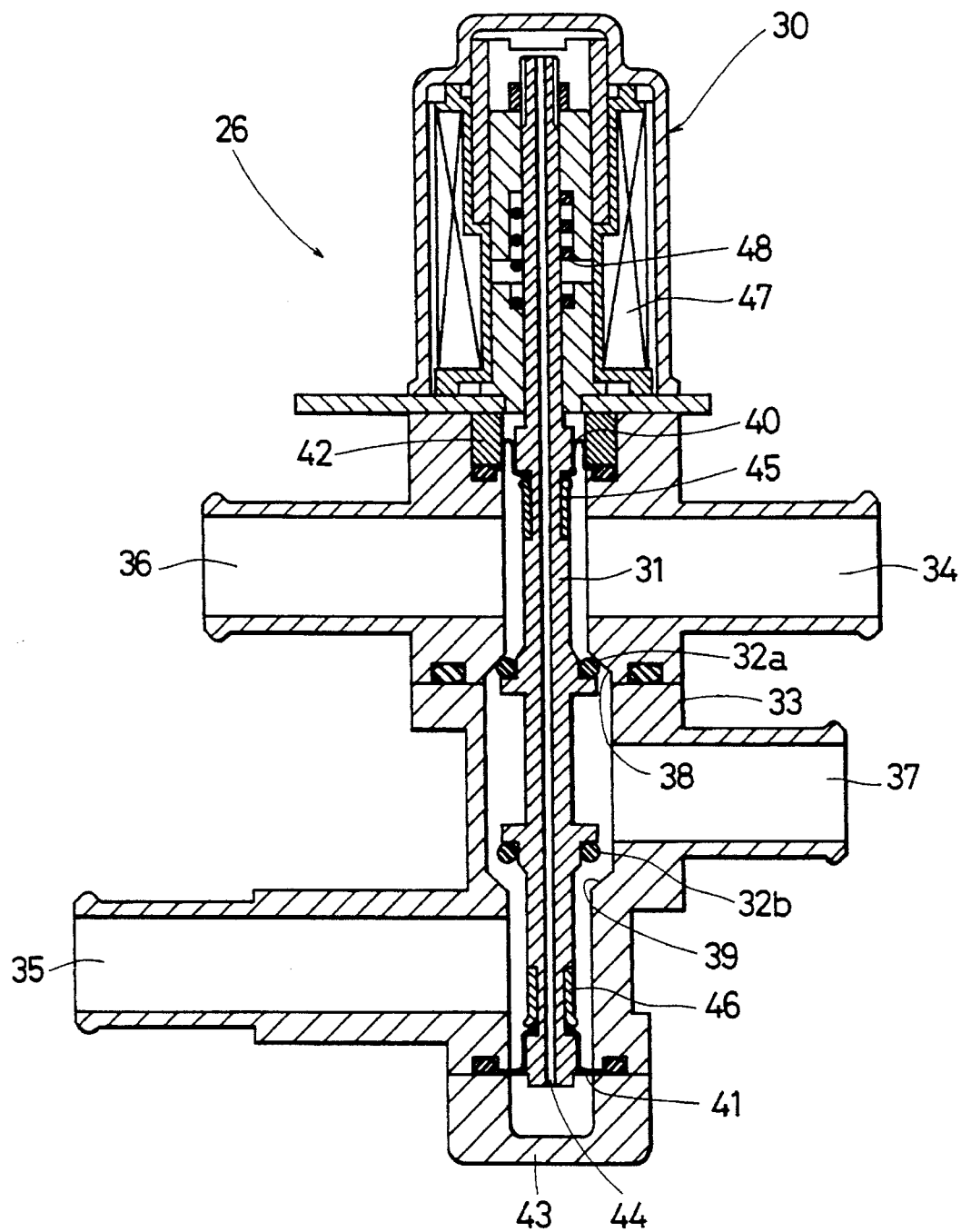
FIG. 2 shows an enlarged cross-sectional view of the valve in the first embodiment of the present invention.

As shown in FIG. 2, the valve system 26 is configured as a four-way switch valve with an electromagnet 30 as a driving means. A first and a second valve body 32a and 32b, respectively, are installed on the plunger 31 of the electromagnet 30. Both valve bodies 32a and 32b are contained in a valve case 33, which has a first and a second inlet 34 and 35, respectively, a first and a second outlet 36 and 37, respectively, and a first and a second valve seat 38 and 39, respectively.

Bellowphragms 40 and 41 are diaphragm sealers made of heat-resisting rubber (e.g., ethylene propylene dien monomer), secured via metal sealers 45 and 46 to the top and bottom of the plunger 31 of the electromagnet 30. The upper bellowphragm 40 is secured to the top of the valve case 33 via a collar 42 to prevent water leakage into the electromagnet 30 above it. The lower bellowphragm 41 is secured to the bottom of the valve case 33 via a cover 43, which encloses the space divided by the bellowphragm 41. The space enclosed by the cover 43 connects to the space in the electromagnet 30 via the through hole 44 on the axis of the plunger 31. The through hole 44 in the plunger 31 allows air to flow between the inside of the electromagnet 30 and the inside of the cover 43 with the deformation of the bellowphragms 40 and 41 when the valve is opened and closed, to balance the two internal pressures for smooth operation during valve opening and closing.

In the electromagnet 30 mentioned above, there is a solenoid coil 47 and a return spring 48 which helps lift the plunger 31. The downward electromagnetic force produced by the solenoid coil 47 as it is energized and the upward spring force of the return spring 48 make a resultant force that drives the valve bodies 32a and 32b.

In this embodiment, the first valve body 32a is the normally-closed type, whereas the second valve body 32b is the normally-open type. When the electromagnet 30 is de-energized, the elastic force of the return spring 48 helps lift the plunger 31, so that the first valve body 32a closes the first valve seat 38 while the second valve body 32b opens the second valve seat 39. Thus, the engine coolant from the heater core 17, which flows through the intake passage 49 (see FIG. 1), is lead from the first inlet 34 to the first outlet 36, while the engine coolant heated in the engine 10, which flows through the return passage 50, is lead from the second inlet 35 to the second outlet 37.

On the other hand, when the solenoid coil 47 of the electromagnet 30 is energized, the electromagnetic force helps lower the plunger 31, so that the first valve body 32a opens the first valve seat 38 whereas the second valve body 32b closes the second valve seat 39. Thus, part of the engine coolant from the heater core 17, which flows through the intake passage 49, is lead from the first valve seat 38 to the second valve body 32b, flowing back to the heater core 17 through the second outlet 37 and the return passage 50.

In this embodiment, the valve system 46 uses the drive control circuit 52 (see FIG. 1) to control the on/off duty ratio of the electromagnet 30 so that the proportion of the cooled engine coolant from the first valve seat 38 to the second valve body 32b and the hot engine coolant from the engine 10 is changed, in order to control the temperature of the engine coolant that flows into the heater core 17.

Figure 3:
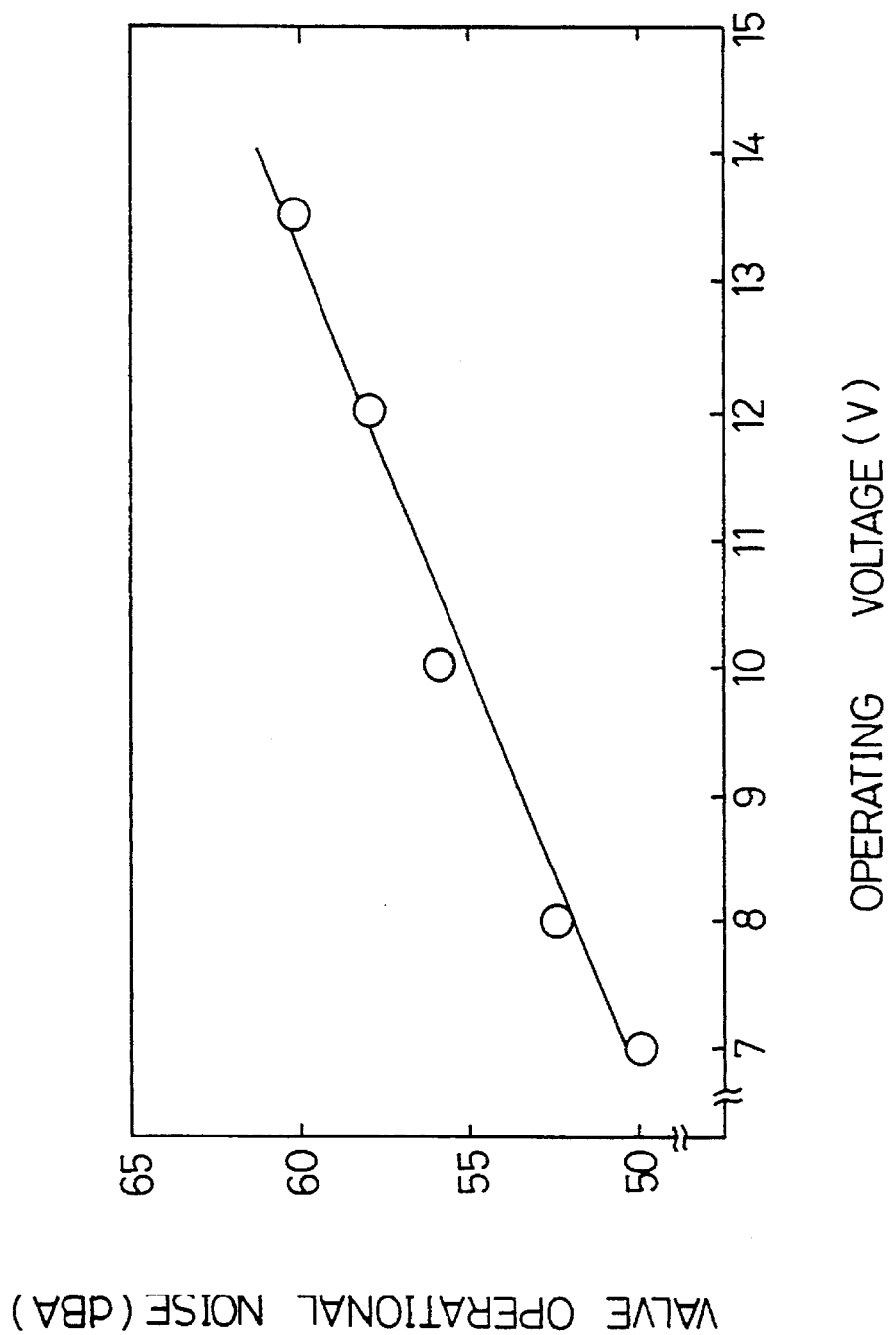
FIG. 3 shows a diagram for the relation between the valve operational noise level measured inside the vehicle and the operating voltage of the electromagnet.

The electromagnetic force produced by the electromagnet 30 increases with the operating voltage. When the electromagnetic force increases, the driving force acting on the valve bodies 32a and 32b also increases. Consequently a moving speed of the valve bodies 32a and 32b becomes high responding to the increased driving force and a larger noise is made at the impact of the second valve body 32b on the second valve seat 39. FIG. 3 shows the relation of the noise level measured inside the vehicle and the operating voltage of the electromagnet 30. The most common operating voltage of 12 V results in about 58 dBA noise, which is enough to be annoying.

Figure 4:
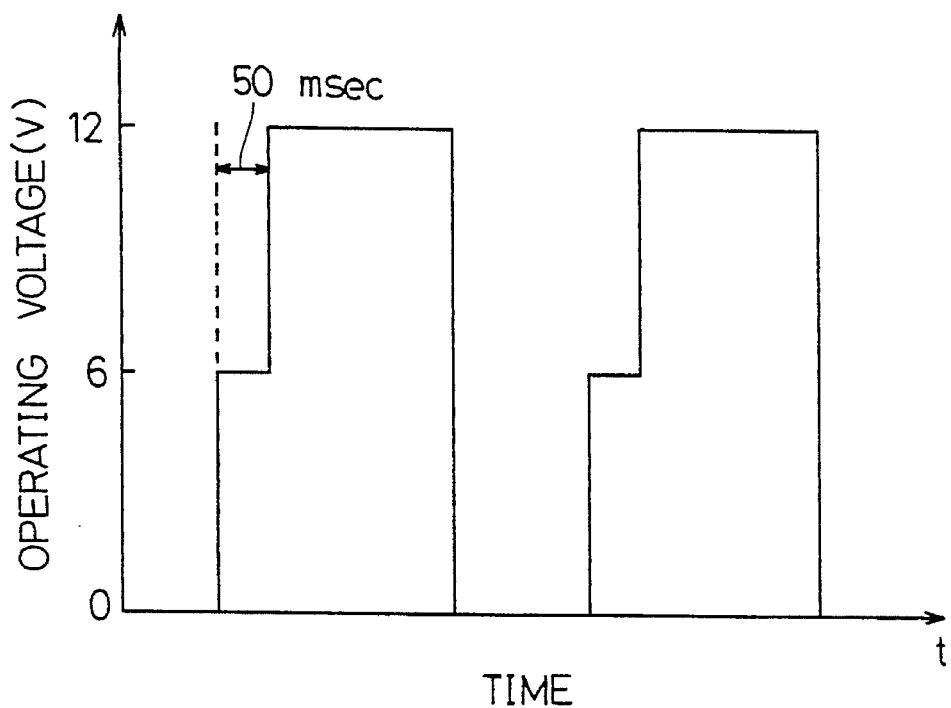
FIG. 4 shows a waveform chart for the operating voltage application pattern to the electromagnet in the first embodiment of the present invention.

In this embodiment, therefore, the operating voltage of the electromagnet 30 is controlled by the drive control circuit 52 (driving force control means) in two steps, for example, so that, as shown in FIG. 4, the operating voltage of the electromagnet 30 is initially set to the minimum operating voltage (6 V, for example; hereinafter referred to as the "first step voltage"), then raised to a voltage where sealing of the closed valve is ensured (12 V, for example) by contacting force between the second valve body 32b and the second valve seat 39; hereinafter referred to as the "second step voltage"). The operating voltage is raised almost simultaneously with the contact of the second valve body 32b with the second valve seat 39 (e.g., 50 millisecond (ms) after the start of the operation).

In the first embodiment, as explained above, the voltage applied to the electromagnet 30 to drive the second valve body 32b from the valve-open position to the valve-close position is initially set to the minimum operating voltage (first step voltage) to reduce the driving force. Thus, the second valve body 32b contacts the second valve seat 39 at a low speed, with less operational noise caused by impact of the second valve body 32b on the second valve seat 39 at valve closing, thus making the system less noisy. Furthermore, the operating voltage is raised to the second step voltage almost simultaneously with the contact of the second valve body 32b with the second valve seat 39, ensuring sealing by a contacting force between the second valve body 32b and the second valve seat 39 in close state.

The first step voltage to be initially applied to the electromagnet 30 must be high enough to produce an electromagnetic force that overcomes the spring force of the return spring 48. Any lower voltage does not work. Obviously, the first step voltage may not be limited to the minimum operating voltage and could set to be slightly higher.

Also, raising the operating voltage to the second step voltage need not necessarily be simultaneous with the contact of the second valve body 32b with the second valve seat 39 (e.g., 50 ms after the start of the operation); it may be slightly earlier or later. If raising to the second step voltage is slightly earlier, the moving speed of the valve is a little higher at the end of the operation than in the above embodiment. Still, the valve speed is lower than prior methods, making the operational noise considerably smaller. On the other hand, if raising to the second step voltage is slightly later, sealing ability is less until the second step voltage is applied after the valve is closed, but causes no practical problem if time lag is small enough.

In the above embodiment, the operating voltage is changed in two steps. However, it may be changed in three or more steps or continuously.

Also, in the above embodiment, the voltage applied to the electromagnet 30 is changed when it is energized. However, the voltage may be decreased in several steps or continuously when it is de-energized, as in the second embodiment of the present invention shown in FIG. 5.

Figure 5:
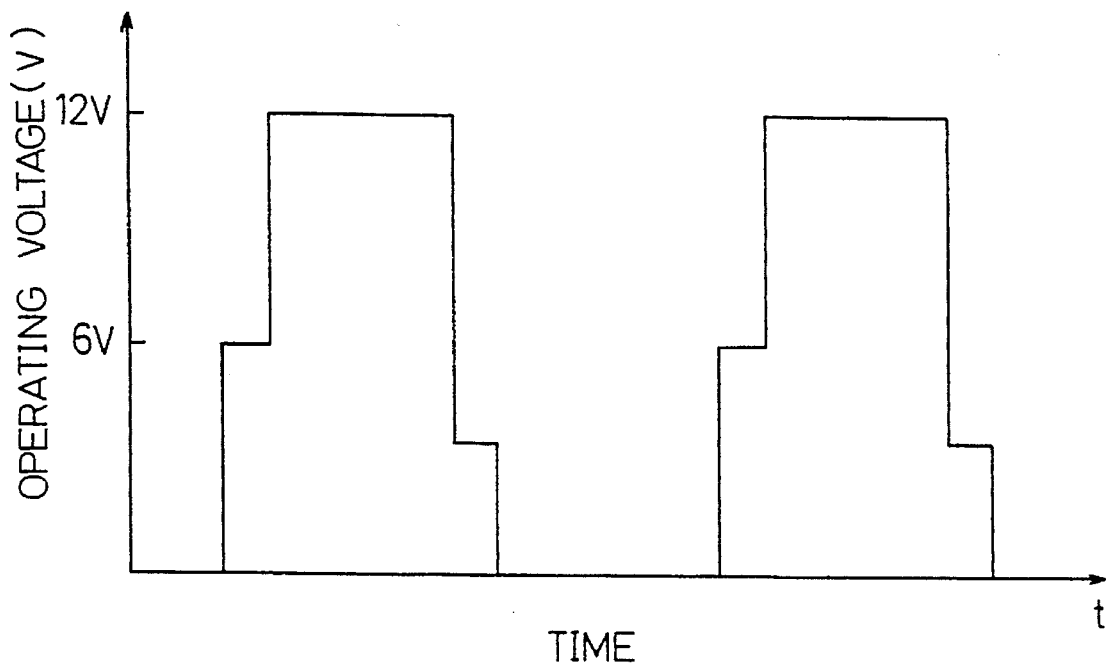
FIG. 5 shows a waveform chart for the operating voltage application to the electromagnet in the second embodiment of the present invention.

For example, as shown in FIG. 5, when it is decreased from 12 V to 0 V, the voltage is dropped to 3 V (hereinafter referred to as the "third step voltage") which is lower than the minimum operating voltage (6 V, for example), then dropped to 0 V after 50 ms, for example. When the voltage is dropped to the third step voltage, the spring force of the return spring 48 overcomes the electromagnetic force of the electromagnet 30, driving the first valve body 32a toward the valve-close position (and the second valve body 32b toward the valve-open position). Since this movement is slowed down by the electromagnetic force of the electromagnet 30, making the valve speed lower and, thus, producing smaller operational noise at de-energizing also.

In this case, the third step voltage may be any voltage below the minimum operating voltage. However, it should preferably be as close to the minimum operating voltage as possible to obtain an effective brake and, therefore, to make the noise smaller. The voltage may be dropped from the first step voltage to 0 V almost simultaneously with the contact of the first valve body 32a with the first valve seat 38, or slightly earlier or later.

Figure 6:
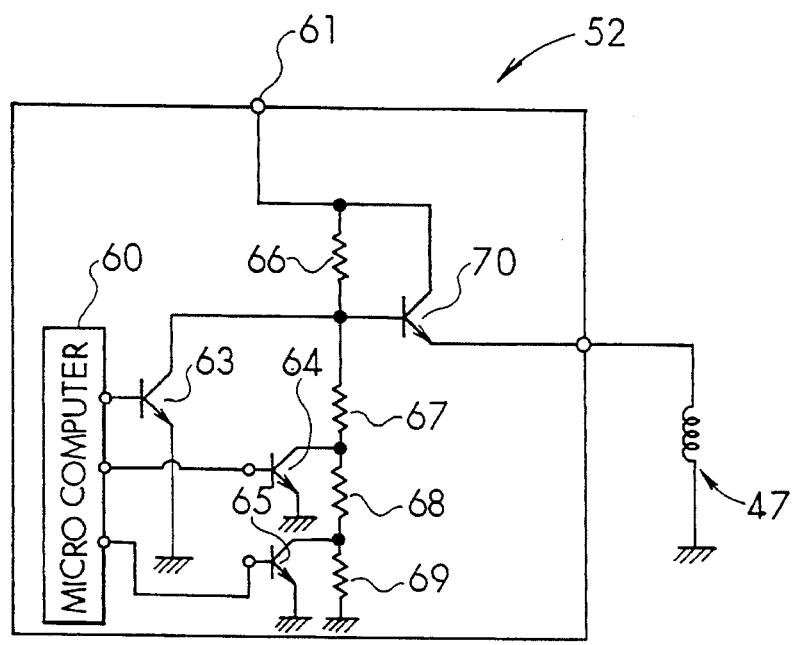
FIG. 6 shows a diagram of the circuit structure in the drive control circuit in the second embodiment of the present invention.

The above mentioned operation is achieved to control operating voltage by a drive circuit in FIG. 6. The drive circuit 52 comprises three transistors 63, 64, and 65, microcomputer 60 controlling the transistors 63, 64 and 65 in on/off state, solenoid coil 47, resistors 66, 67, 68 and 69 determining voltage applied to solenoid coil 47 and transistor 70. When the first, second and third step voltages are set 6 V, 12 V and 3 V respectively, resistance values of R1, R2, R3 and R4 of resistors 66 through 69 respectively have following relations;

R1>R2, R3, R4

R2=R3+R4

R3=R4

The voltage applied to solenoid coil 47 is set as shown in Table 1 based on on/off state of transistors 63 through 65.

TABLE 1

| TRANSISTOR 63 | ON | | | | OFF | | | |
|---|---|---|---|---|---|---|---|---|
| TRANSISTOR 64 | ON | | OFF | | ON | | OFF | |
| TRANSISTOR 65 | ON | OFF | ON | OFF | ON | OFF | ON | OFF |
| APPLIED VOLTAGE TO SOLENOID COIL 47 | | 0V | | | 6V | | 3V | 12V |

Figure 7:
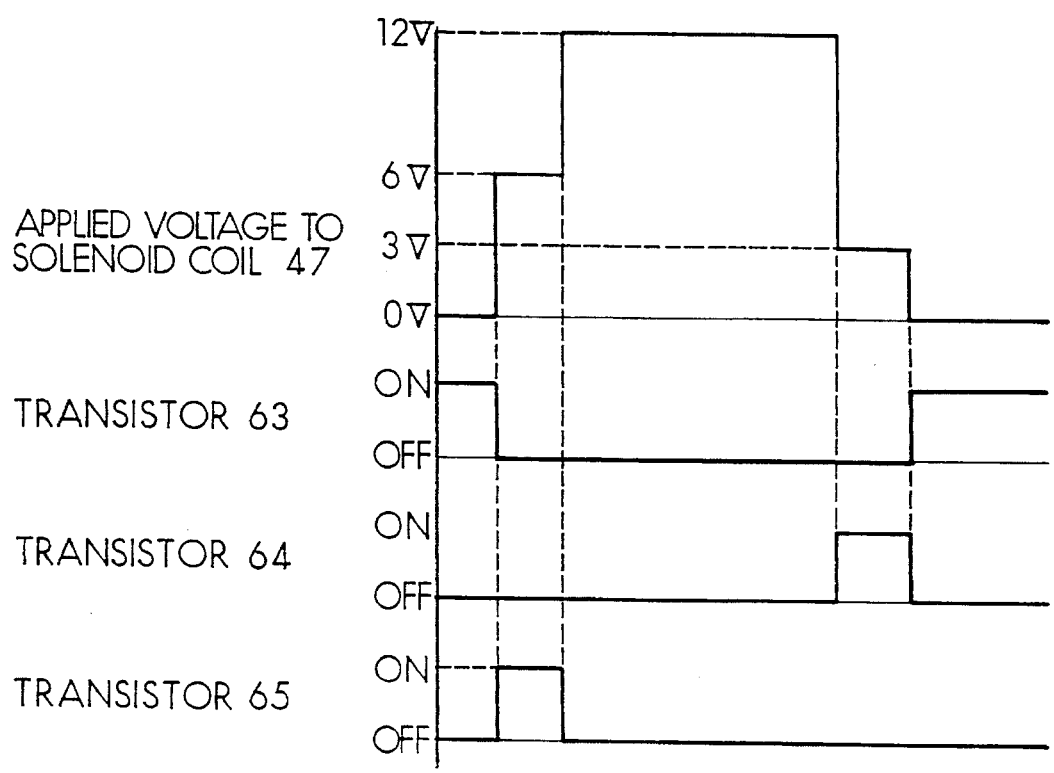
FIG. 7 shows a waveform chart for the operating voltage application to the electromagnet in the second embodiment of the present invention.

For example, on/off state of three transistors 63, 64 and 65 are controlled by computer 60 along time base as shown in FIG. 7. Consequently, the voltage is varied stepwise 0 V→6 V→12 V→3 V→0 V.

In the above embodiment, the electromagnet 30 is used as a driving means. However, a motor or other electromotive actuator, or an actuator of a pneumatic, hydraulic or other power source may be used. Also, unlike the above embodiment, where one electromagnet 30 (driving means) is used to drive two valve bodies 32a and 32b, one driving means may be used to drive one valve body, or one driving means may be used to drive one valve body, or one driving means may be used to drive three or more valve bodies. Furthermore, the internal construction of the valve system may be changed as necessary according the type of the equipment in which the valve driving system of the present invention is to be installed.

The application of the present invention is not limited to the valve systems of automotive air conditioning equipment. Obviously, it may be applied to any other valve systems where noise control is necessary, and may be modified as long as its basic design is maintained.

As explained above, the valve driving system of the present invention initially uses a small driving force to slow down the valve body, making less noise, when driving the valve body using a driving means. Also, the driving force of the driving means is later increased by the driving force control means, ensuring the valve sealing in the normally-open type valve (the force maintaining the valve body open in the normally-closed type).

What is claimed is:

1. A valve driving system for opening and closing a passage, said valve driving system comprising:

a valve case having a part of the passage formed therein;

a valve seat disposed in said valve case;

a valve body movably disposed in said valve case;

driving means for driving said valve body between a valve-close position where said valve body is contacted with said valve seat and a valve-open position where said valve body is separated from said valve seat; and driving force control means for controlling a stepwise movement of said driving means by utilizing a duty ratio control, wherein said driving means generates a driving force to move said valve body by varying voltage to be applied thereto, and said driving force control means sends "ON and OFF" signals to said driving means to control a driving force of said driving means so that each time an "ON" signal is sent, said driving means initially receives low voltage and receives higher voltage afterwards, and wherein said valve body is contacted with said valve seat by said low voltage and a sealing force between said valve body and said valve seat is increased by said higher voltage.

2. A valve driving system for opening and closing a passage according to claim 1, wherein said driving means generating a driving force to move said valve body by varying voltage to be applied thereto, and said driving force control means sending "ON and OFF" signals to said driving means to control a driving force of said driving means so that when each time an "OFF" signal is sent, said driving means is initially receives low voltage and shuts voltage afterwards.

3. A normally-open type valve driving system for opening and closing a passage, said system comprising:

a valve case which a part of the passage is formed therein;

a valve seat formed in said valve case;

a valve body movably disposed in said valve case;

valve body forcing means for generating a return force to normally maintain separation between said valve body and said valve seat;

driving means for driving said valve body to a valve-close position where said valve body is contracted with said valve seat despite of said return force; and driving force control means for controlling said driving means stepwise so that said valve body moves stepwise, wherein said driving force control means includes first means for controlling said driving means to drive said valve body to said closed position with a lower force and second means for controlling said driving means to increase a sealing force between said valve body and said valve seat with a higher force.

4. A normally-open type valve driving system for opening and closing a passage according to claim 3, wherein said valve body forcing means is spring means.

5. A normally-open type valve driving system for opening and closing a passage according to claim 4, wherein the driving force of said driving means which is initially weakened is stronger than the return force, and wherein said lower force of said driving means is stronger than said return force.

6. A valve driving system for opening and closing a passage comprising:

a valve case which a part of the passage is formed therein;

a first valve seat formed in said valve case;

a second valve seat formed in said valve case;

a valve body movably disposed in said valve case, said valve body having a normally-close type valve body, a normally-open type valve body, and a shaft connecting said normally-close type valve body with a normally-open type valve body as a unit;

valve body forcing means for generating a return force to normally maintain said normally-close type valve body in a valve-close position where said normally-open type valve body is contacted with said first valve seat and to normally maintain said normally-open type valve body in a valve-open position where said normally-open type valve body is separated from said second valve seat;

driving means for driving said valve body despite said return force to a position where said normally-close type valve body is separated from said first valve seat and where said normally-open type valve body is contacted with said second valve seat; and a driving force control means for controlling said driving means stepwise so that said valve body moves stepwise, said driving force control means including first means for controlling said driving means to drive said valve body to said closed position with a lower force and second means for controlling said driving means to increase a sealing force between said valve body and said valve seat with a higher force.

7. A valve driving system for opening and closing a passage according to claim 6, wherein said valve body forcing means is spring means.

8. A valve driving system for opening and closing a passage according to claim 7, wherein the driving force of said driving means which is afterwards weakened is stronger than the return force, and wherein said lower force of said driving means is stronger than said return force.

* * * * *